(12) United States Patent
Hirai et al.

(10) Patent No.: US 11,365,295 B2
(45) Date of Patent: Jun. 21, 2022

(54) FIBER-REINFORCED RESIN COMPOSITION AND METHOD OF PRODUCING THE SAME

(71) Applicant: TOYOTA JIDOSHA KABUSHIKI KAISHA, Toyota (JP)

(72) Inventors: Takayuki Hirai, Nagakute (JP); Kenzo Fukumori, Nagakute (JP); Tetsuya Oda, Toyota (JP); Takayuki Nagai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 21 days.

(21) Appl. No.: 16/387,757

(22) Filed: Apr. 18, 2019

(65) Prior Publication Data
US 2019/0367689 A1 Dec. 5, 2019

(30) Foreign Application Priority Data
Jun. 5, 2018 (JP) .............................. JP2018-107803

(51) Int. Cl.
| | | |
|---|---|---|
| C08J 5/04 | (2006.01) | |
| C08J 3/22 | (2006.01) | |
| C08L 23/12 | (2006.01) | |
| C08L 77/02 | (2006.01) | |
| C08L 77/04 | (2006.01) | |
| C08L 77/06 | (2006.01) | |

(52) U.S. Cl.
CPC ............... *C08J 5/042* (2013.01); *C08J 3/226* (2013.01); *C08L 23/12* (2013.01); *C08L 77/02* (2013.01); *C08L 77/04* (2013.01); *C08L 77/06* (2013.01); *C08J 2323/12* (2013.01); *C08J 2377/02* (2013.01); *C08J 2377/04* (2013.01); *C08J 2377/06* (2013.01); *C08J 2423/12* (2013.01); *C08J 2477/02* (2013.01); *C08J 2477/04* (2013.01); *C08J 2477/06* (2013.01); *C08L 2205/08* (2013.01); *C08L 2310/00* (2013.01)

(58) Field of Classification Search
CPC .. C08J 3/226; C08J 5/042; C08J 5/043; C08L 2666/54; C08L 2666/66; C08L 2666/70; C08L 2310/00
See application file for complete search history.

(56) References Cited

U.S. PATENT DOCUMENTS

| | | | |
|---|---|---|---|
| 4,912,150 A | | 3/1990 | Ushiroji et al. |
| 5,866,648 A | * | 2/1999 | Saito ................. C08J 3/226 524/494 |
| 2012/0028047 A1 | | 2/2012 | Imai et al. |
| 2018/0273738 A1 | | 9/2018 | Miyamoto et al. |

FOREIGN PATENT DOCUMENTS

| | | |
|---|---|---|
| EP | 3281969 B1 | 3/2020 |
| JP | H06-179784 A | 6/1994 |
| JP | 07119349 B2 | 12/1995 |
| JP | 2013-203772 A | 10/2013 |
| JP | 2018162338 A | 10/2018 |
| KR | 100792115 B1 | 1/2008 |
| KR | 1020110130385 A | 12/2011 |
| KR | 1020150023819 A | 3/2015 |
| WO | 95/34598 A1 | 12/1995 |
| WO | 2013191307 A1 | 12/2013 |

* cited by examiner

*Primary Examiner* — Ana L. Woodward
(74) *Attorney, Agent, or Firm* — Dickinson Wright PLLC

(57) ABSTRACT

A fiber-reinforced resin composition includes a polyamide resin and a polyolefin resin, and when one resin between the polyamide resin and the polyolefin resin is set as a first resin, and the other resin is set as a second resin, the composition has a sea-island structure including a continuous phase C consisting of the first resin and a dispersed phase c consisting of the second resin dispersed in the continuous phase C, and in a resin phase separation cross-sectional structure, a total of cross-sectional areas of dispersed phases having a cross-sectional area equal to or smaller than an average cross-sectional area of the reinforcing fiber is 20% or less with respect to a total of cross-sectional areas of all dispersed phases.

4 Claims, 7 Drawing Sheets

COMPARATIVE EXAMPLE

FIBER-REINFORCED RESIN COMPOSITION AND METHOD OF PRODUCING THE SAME

INCORPORATION BY REFERENCE

The disclosure of Japanese Patent Application No. 2018-107803 filed on Jun. 5, 2018 including the specification, drawings and abstract is incorporated herein by reference in its entirety.

BACKGROUND

1. Technical Field

The present disclosure relates to a fiber-reinforced resin composition and a method of producing the same.

2. Description of Related Art

In the related art, in order to improve physical properties of resins, polymer blends and polymer alloys in which resins with different properties are mixed together to modify properties of the resins have been actively studied. However, in such polymer blends and polymer alloys, for example, in a resin composition in which resins with different polarities such as a polyamide resin and a polyolefin resin are combined, since compatibility between the resins is low, there is a problem that the strength is likely to decrease.

In addition, fiber-reinforced resin compositions in which a reinforcing fiber such as a carbon fiber and a glass fiber is incorporated into a resin composition are widely used for airplanes, automobiles, railway vehicles, ships, and other general industrial applications for which a particularly high mechanical strength is required and actively being studied because they has an excellent impact strength and elastic modulus. For example, Japanese Unexamined Patent Application Publication No. 6-179784 (JP 6-179784 A) describes a polypropylene composition including (A) 40 weight % to 55 weight % of a polypropylene resin having a melt flow rate (MFR: JIS K6758) of 0.1 g/10 min to 4.0 g/10 min, (B) 60 weight % to 45 weight % of a polyamide having a relative viscosity (96% $H_2SO_4$, 25° C.) [$\eta_r$] of 2.0 to 2.7, (C) 10 parts by weight to 30 parts by weight of a modified polypropylene resin on which an unsaturated carboxylic acid or derivatives thereof are grafted with respect to (A)+(B)=100 parts by weight and having a graft amount of 0.1 weight % to 3.0 weight %, and (D) 20 parts by weight to 150 parts by weight of glass fibers with respect to (A)+(B)=100 parts by weight. However, in such a fiber reinforced thermoplastic resin composition including reinforcing fibers, while somewhat excellent impact strength and elastic modulus and the like are exhibited, there are problems that cracks which are thought to be mainly caused due to concentration of stress at ends of the reinforcing fibers and rapid cracking (brittle fracture) due to rapid propagation of the cracks are likely to occur.

SUMMARY

The present disclosure provides a fiber-reinforced resin composition in which the occurrence of brittle fracture is sufficiently curbed and a method of producing the same.

The inventors conducted extensive studies and as a result, found that, in a fiber-reinforced resin composition including a polyamide resin, a polyolefin resin, and a reinforcing fiber, when contents of the polyamide resin, the polyolefin resin, and the reinforcing fiber are all set to be within a specific range; a resin phase separation cross-sectional structure of the fiber-reinforced resin composition has, when one resin between the polyamide resin and the polyolefin resin is set as a first resin, and the other resin is set as a second resin, a bicontinuous structure including a bicontinuous phase having a continuous phase A consisting of the first resin and a continuous phase B consisting of the second resin and at least one dispersed phase of a dispersed phase a consisting of the second resin dispersed in the continuous phase A and a dispersed phase b consisting of the first resin dispersed in the continuous phase B or a sea-island structure including a continuous phase C consisting of the first resin and a dispersed phase c consisting of the second resin dispersed in the continuous phase C; and in a resin phase separation cross-sectional structure observed under a microscope, a proportion of dispersed phases (small dispersed phases) having a cross-sectional area smaller than an average cross-sectional area of the reinforcing fiber among the dispersed phases (a total cross-sectional area of small dispersed phases/a total cross-sectional area of all dispersed phases) is sufficiently reduced, and thus brittleness is significantly improved and the occurrence of brittle fracture is sufficiently curbed.

That is, a first aspect of the present disclosure relates to a fiber-reinforced resin composition including a polyamide resin, a polyolefin resin, and a reinforcing fiber, in which a content of the polyamide resin and a content of the polyolefin resin are 7 mass % to 93 mass %, and 7 mass % to 93 mass %, respectively, with respect to a total of 100 mass % of the polyamide resin and the polyolefin resin, a content of the reinforcing fiber is 10 parts by mass to 200 parts by mass with respect to a total of 100 parts by mass of the polyamide resin and the polyolefin resin, the composition has, when one resin between the polyamide resin and the polyolefin resin is set as a first resin, and the other resin is set as a second resin, a bicontinuous structure including a bicontinuous phase having a continuous phase A consisting of the first resin and a continuous phase B consisting of the second resin and at least one dispersed phase of a dispersed phase a consisting of the second resin dispersed in the continuous phase A and a dispersed phase b consisting of the first resin dispersed in the continuous phase B or a sea-island structure including a continuous phase C consisting of the first resin and a dispersed phase c consisting of the second resin dispersed in the continuous phase C, and in a resin phase separation cross-sectional structure observed under a microscope, a total of cross-sectional areas of dispersed phases having a cross-sectional area equal to or larger than an average cross-sectional area of the reinforcing fiber is 20% or less with respect to a total of cross-sectional areas of all dispersed phases observed under the microscope.

In the resin phase separation cross-sectional structure observed under the microscope, a total of cross-sectional areas of the reinforcing fibers present in the phase consisting of the polyamide resin may 75% or more with respect to a total of cross-sectional areas of all reinforcing fibers observed under the microscope.

In addition, the polyolefin resin may contain a polymer in which a content of structural units derived from propylene is 50 mol % or more of all structural units of the polyolefin resin. A melt flow rate of the polyolefin resin may be 0.1 g/10 min to 20 g/10 min.

In addition, the polyamide resin may contain at least one selected from the group consisting of polyamide 6, polyamide 66, polyamide 610, and polyamide 11. In addition, the reinforcing fiber may be at least one selected from the group consisting of a carbon fiber and a glass fiber.

In addition, the fiber-reinforced resin composition may further include a compatibilizer. A content of the compatibilizer may be 20 parts by mass or less with respect to a total of 100 parts by mass of the polyamide resin and the polyolefin resin.

In addition, a second aspect of the present disclosure relates to a method of producing a fiber-reinforced resin composition including a first process of mixing a polyamide resin and a reinforcing fiber to obtain a mixture and a second process of mixing the mixture with a polyolefin resin to obtain the fiber-reinforced resin composition of the present disclosure. In the first process, an amount of the reinforcing fibers mixed with the polyamide resin is 75 mass % or more with respect to a total of 100 mass % of all reinforcing fibers blended into the fiber-reinforced resin composition.

Here, the inventors speculate as follows. That is, in the fiber-reinforced resin composition including the polyamide resin, the polyolefin resin, and the reinforcing fiber of the present disclosure, since the polyamide resin and the polyolefin resin are not compatible with each other, as a resin phase separation cross-sectional structure, a bicontinuous structure composed of two continuous phases including a dispersed phase forms a sea-island structure including a continuous phase including a dispersed phase. In the resin phase separation cross-sectional structure according to the present disclosure, since a proportion of dispersed phases (small dispersed phases) having a small cross-sectional area, that is, a cross-sectional area equal to or smaller than an average cross-sectional area of the reinforcing fiber, among the dispersed phases is sufficiently small, a phase in which the reinforcing fiber is present with respect to the reinforcing fiber is sufficiently large. In addition, in the fiber-reinforced resin composition of the present disclosure, it is thought that, regarding reinforcing fiber ends in which cracks easily occur as stress concentration points when a bending force is applied, it is preferable that an outer phase (preferably, a phase mainly consisting of a polyolefin resin) surrounding a phase (preferably, a phase mainly consisting of a polyamide resin) in which the reinforcing fiber ends are present be formed in a fibril form, and the occurrence and propagation of cracks thus be curbed. However, the inventors speculate that, when such a phase is sufficiently large as described above, an effect of curbing the occurrence and propagation of such cracks is sufficiently exhibited and the occurrence of brittle fracture is curbed.

According to the present disclosure, it is possible to provide a fiber-reinforced resin composition in which the occurrence of brittle fracture is sufficiently curbed and a method of producing the same.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1A:
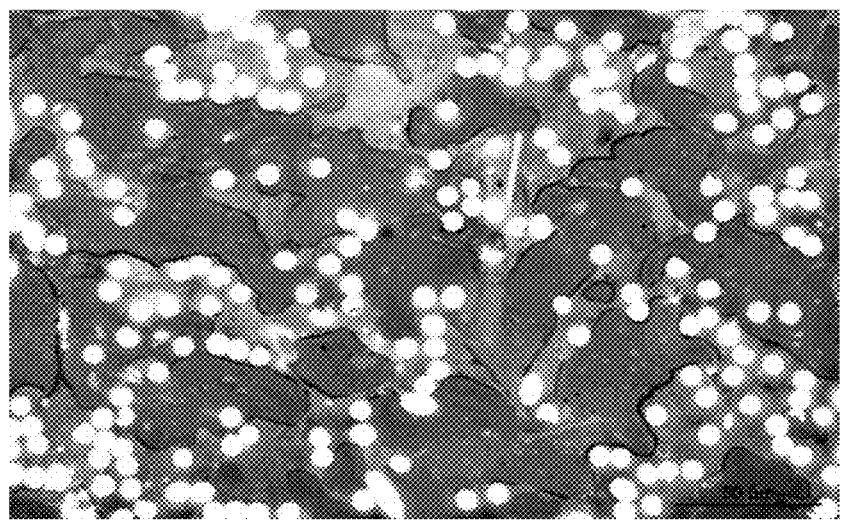
FIG. 1A is an optical microscope image of a cross section of a test piece for measuring physical properties obtained in Example 1.

The present disclosure will be described below in detail with reference to exemplary embodiments.

(Fiber-Reinforced Resin Composition)

First, a fiber-reinforced resin composition according to an embodiment of the present disclosure will be described. The fiber-reinforced resin composition of the present embodiment is a fiber-reinforced resin composition including a polyamide resin, a polyolefin resin, and a reinforcing fiber, in which a content of the polyamide resin and a content of the polyolefin resin are 7 mass % to 93 mass %, and 7 mass % to 93 mass % with respect to a total of 100 mass % of the polyamide resin and the polyolefin resin, a content of the reinforcing fiber is 10 parts by mass to 200 parts by mass with respect to a total of 100 parts by mass of the polyamide resin and the polyolefin resin, and when one resin between the polyamide resin and the polyolefin resin is set as a first resin, and the other resin is set as a second resin, it has a bicontinuous structure including a bicontinuous phase having a continuous phase A consisting of the first resin and a continuous phase B consisting of the second resin and at least one dispersed phase of a dispersed phase a consisting of the second resin dispersed in the continuous phase A and a dispersed phase b consisting of the first resin dispersed in the continuous phase B or a sea-island structure including a continuous phase C consisting of the first resin and a dispersed phase c consisting of the second resin dispersed in the continuous phase C, and in a resin phase separation cross-sectional structure observed under a microscope, a total of cross-sectional areas of dispersed phases having a cross-sectional area equal to or smaller than an average cross-sectional area of the reinforcing fiber is 20% or less with respect to a total of cross-sectional areas of all dispersed phases.

[Polyamide Resin]

In the present embodiment, the polyamide resin refers to a polymer (polyamide) having a chain framework in which a plurality of monomers are homopolymerized or copolymerized via amide bonds (—NH—CO—) and a mixture thereof.

Examples of monomers constituting the polyamide include amino acids such as aminocaproic acid, 11-aminoundecanoic acid, aminododecanoic acid, and paraaminomethylbenzoic acid; and lactams such as ε-caprolactam, undecane lactam, and ω-lauryl lactam. These monomers may be used alone or two or more types thereof may be used in combination.

In addition, the polyamide may be a copolymer including diamine and dicarboxylic acid as monomers. Examples of the diamine include aliphatic diamines such as ethylenediamine, 1,3-diaminopropane, 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-di aminoheptadecane, 1,18-diaminooctadecane, 1,19-diaminononadecane, 1,20-diaminoeicosane, 2-methyl-1,5-diaminopentane, and 2-methyl-1,8-diaminooctane; alicyclic diamines such as cyclohexanediamine, and bis-(4-aminocyclohexyl)methane; and aromatic diamines such as xylylenediamine, p-phenylenediamine, and m-phenylenediamine. One of these may be used alone or two or more types thereof may be used in combination. Examples of the dicarboxylic acid include aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, brassic acid, tetradecanedioic acid, pentadecanedioic acid, and octadecanedioic acid; alicyclic dicarboxylic acids such as cyclohexane dicarboxylic acid; and aromatic dicarboxylic acids such as phthalic acid, terephthalic acid, isophthalic acid, and naphthalene dicarboxylic acid. One of these may be used alone or two or more types thereof may be used in combination.

Examples of such a polyamide include polyamide 11 (PA11) obtained using a monomer having 11 carbon atoms as the monomer; polyamide 12 (PA12); polyamide 6 (PA6) obtained by homopolymerizing ε-caprolactam among monomers having 6 carbon atoms; polyamide 66 (PA66) obtained by copolymerizing hexamethylenediamine and adipic acid; polyamide 610 (PA610) obtained by copolymerizing sebacic acid derived from castor oil as a vegetable oil and petroleum-derived hexamethylenediamine; polyamide 612 (PA612); polyamide 6T (PA6T) obtained by copolymerizing hexamethylenediamine and terephthalic acid; polyamide 6I (PA6I); polyamide 9T (PA9T); polyamide M5T (PAM5T); polyamide 1010 (PA1010); polyamide 1012 (PA1012); polyamide 10T; polyamide MXD6 which is a crystalline polyamide obtained from metaxylylenediamine (MXDA) and adipic acid; polyamide 6T/66; polyamide 6T/6I; polyamide 6T/6I/66; polyamide 6T/2M-5T; and polyamide 9T/2M-8T. One of these may be used alone or two or more types thereof may be used in combination.

A method of obtaining such a polyamide is not particularly limited, and a known method can be appropriately used and a commercially available one may be appropriately used.

A number average molecular weight (Mn) of the polyamide according to the present embodiment is not particularly limited. However, a number average molecular weight (in terms of polystyrene) according to gel permeation chromatography (GPC) is preferably 5,000 to 500,000, and more preferably 10,000 to 100,000.

Among these polyamides, for the polyamide resin according to the present embodiment, in consideration of a relatively low melting point and a tendency to curb decomposition of the polyolefin resin during mixing, at least one selected from the group consisting of aliphatic polyamides (for example, polyamide 6, polyamide 66, polyamide 610, polyamide 11, polyamide 12, polyamide 46, and polyamide 612) which are polyamides having no aromatic ring in their molecule is preferably contained, and at least one selected from the group consisting of polyamide 6, polyamide 66, polyamide 610, and polyamide 11 is more preferably contained, and at least one (a mixture in the case of two or more types) selected from the group consisting of polyamide 6, polyamide 66, and polyamide 610 is preferably contained at 80 mass % or more or more preferably 100 mass % with respect to a total mass of the polyamide resin.

[Polyolefin Resin]

In the present embodiment, the polyolefin resin refers to a polymer (polyolefin) including alkenes (olefins) having one carbon-carbon double bond as monomers and a mixture thereof.

Examples of monomers constituting the polyolefin include ethylene; and an α-olefin which is an unsaturated hydrocarbon compound having 3 to 20 carbon atoms (for example, propylene, 1-butene, 1-pentene, 1-hexene, 1-heptene, 3-methyl-1-butene, and 4-methyl-1-pentene). One of these may be used alone or two or more types thereof may be used in combination.

Examples of such a polyolefin include polyethylene (PE), polypropylene (PP), an ethylene-α-olefin copolymer, and a propylene-α-olefin copolymer. One of these may be used alone or two or more types thereof may be used in combination. A method of obtaining such a polyolefin is not particularly limited, and a known method can be appropriately used and a commercially available one may be appropriately used.

A weight average molecular weight (Mw) of the polyolefin according to the present embodiment is not particularly limited. However, a weight average molecular weight (in terms of polystyrene) according to gel permeation chromatography (GPC) is preferably 10,000 to 500,000, more preferably 50,000 to 450,000, and most preferably 100,000 to 400,000.

Among these polyolefins, for the polyolefin resin according to the present embodiment, in consideration of a tendency to crystallize and improve mechanical properties and chemical resistance, a polymer in which a content of a structural unit derived from propylene is 50 mol % or more of all structural units is preferably contained, and at least one selected from the group consisting of polymers of propylene, and ethylene and/or an α-olefin having 3 to 8 carbon atoms is more preferably contained, and at least one (a mixture in the case of two or more types) selected from the group consisting of polymers (more preferably, polypropylene) of propylene, and ethylene and/or an α-olefin having 3 to 8 carbon atoms is preferably contained at 80 mass % or more, and more preferably 100 mass % with respect to a total mass of the polyolefin resin.

In addition, for the polyolefin resin according to the present embodiment, in consideration of a tendency to further reduce a proportion of the following small dispersed phases in the resin phase separation cross-sectional structure of the fiber-reinforced resin composition, a melt flow rate (MFR) measured according to JIS K7210 at 230° C. and 21.18 N is preferably 0.1 g/10 min to 50 g/10 min, more preferably 0.1 g/10 min to 30 g/10 min, and most preferably 0.1 g/10 min to 20 g/10 min.

[Reinforcing Fiber]

As the reinforcing fiber according to the present embodiment, a known resin reinforcing fiber can be appropriately used. For example, a carbon fiber, a glass fiber, an alumina fiber, a BN fiber, an aramid fiber, and a PBO fiber may be used. One of these may be used alone or two or more types thereof may be used in combination. Among these, as the reinforcing fiber according to the present embodiment, in consideration of a tendency to further increase the strength and elastic modulus of the fiber-reinforced resin composition, at least one selected from the group consisting of a carbon fiber and a glass fiber is preferable.

In the present embodiment, the shape of the reinforcing fiber includes a shape such as a fibrous shape, a needle shape, a plate shape, and a cylindrical shape, and a shape with an aspect ratio (the longest diameter/the shortest diameter) of greater than 3 (preferably, 10 or more) which is represented by a ratio between the longest diameter and the shortest diameter of primary particles is preferable. In addition, in the reinforcing fiber according to the present embodiment, the longest diameter of the primary particles is preferably 100 μm to 10,000 μm (more preferably, 300 μm to 10,000 μm), and the shortest diameter is preferably 30 nm to 30,000 nm (more preferably 15 nm to 15,000 nm). Here, in the present embodiment, the longest diameter and the shortest diameter of the reinforcing fiber can be measured through observation under a scanning electron microscope (SEM). In addition, in the present embodiment, the longest diameter of the primary particles refers to a length of the primary particles in the long axis direction observed under an SEM, and the shortest diameter refers to a length of the same primary particles in the short axis direction.

[Other Components]

The fiber-reinforced resin composition of the present embodiment can further include a compatibilizer. In the present embodiment, the compatibilizer indicates a component functioning as a compatibilizer that makes the polyamide resin and the polyolefin resin compatible, and for example, a modified elastomer which is an elastomer having a reactive group that can react with the polyamide resin, may be exemplified. As the elastomer, at least one selected from the group consisting of an olefinic thermoplastic elastomer and a styrene thermoplastic elastomer is more preferable.

Examples of the olefinic thermoplastic elastomer include ethylene; and a copolymer including two or more types of α-olefin such as propylene, 1-butene, 1-pentene, and 1-octene as monomers. One of these may be used alone or two or more types thereof may be used in combination. Specific examples of the olefinic thermoplastic elastomer include an ethylene-propylene copolymer (EPR), an ethylene-1-butene copolymer (EBR), an ethylene-1-pentene copolymer, an ethylene-1-octene copolymer (EOR), a propylene-1-butene copolymer (PBR), a propylene-1-pentene copolymer, and a propylene-1-octene copolymer (POR).

Examples of the styrene thermoplastic elastomer include a block copolymer of a styrene compound and a conjugated diene compound and a hydrogenated product thereof. Examples of the styrene compound include styrene; an alkylstyrene such as α-methylstyrene, p-methylstyrene, and p-t-butylstyrene; p-methoxystyrene; and vinylnaphthalene. Examples of the conjugated diene compound include butadiene, isoprene, piperylene, methylpentadiene, phenylbutadiene, 3,4-dimethyl-1,3-hexadiene, and 4,5-diethyl-1,3-octadiene. Specific examples of the styrene thermoplastic elastomer include a styrene-butadiene-styrene copolymer (SBS), a styrene-isoprene-styrene copolymer (SIS), a styrene-ethylene/butylene-styrene copolymer (SEBS), and a styrene-ethylene/propylene-styrene copolymer (SEPS).

Examples of the reactive group that can react with the polyamide resin include an acid anhydride group (—CO—O—OC—), a carboxyl group (—COOH), an epoxy group [—$C_2O$ (a 3-membered ring structure consisting of two carbon atoms and one oxygen atom)], an oxazoline group (—$C_3H_4NO$), and an isocyanate group (—NCO). One of these may be used alone or two or more types thereof may be used in combination. Among these, in consideration of a tendency to further improve reactivity with the polyamide resin, the reactive group is preferably an acid anhydride group.

In addition, a method of providing the reactive group to the elastomer is not particularly limited, and a known method can be appropriately used. Examples of such a method include a method of adding an acid anhydride as a monomer when the elastomer is synthesized. Examples of the acid anhydride include maleic anhydride, phthalic anhydride, itaconic anhydride, succinic anhydride, glutaric anhydride, adipic anhydride, citraconic anhydride, tetrahydrophthalic anhydride, and butenyl succinic anhydride. One of these may be used alone or two or more types thereof may be used in combination.

Specific examples of such a modified elastomer include a maleic anhydride modified olefinic thermoplastic elastomer such as a maleic anhydride modified EPR, a maleic anhydride modified PBR, a maleic anhydride modified EBR, a maleic anhydride modified EOR, and a maleic anhydride modified POR; and a maleic anhydride modified styrene thermoplastic elastomer such as a maleic anhydride modified SEBS, a maleic anhydride modified SBS, a maleic anhydride modified SIS, and a maleic anhydride modified SEPS. One of these may be used alone or two or more types thereof may be used in combination. In addition, a commercially available one may be appropriately used as the modified elastomer.

The modified elastomer is not particularly limited. However, a weight average molecular weight (in terms of polystyrene) according to gel permeation chromatography (GPC) is preferably 10,000 to 500,000, more preferably 20,000 to 500,000, and most preferably 25,000 to 400,000.

When the fiber-reinforced resin composition of the present embodiment further includes the compatibilizer, as the compatibilizer, in consideration of greater compatibility with the polyolefin resin, at least one selected from the group consisting of the modified elastomers is more preferable, and at least one selected from the group consisting of a maleic anhydride modified SEBS (m-SEBS), a maleic anhydride modified EBR (m-EBR), and a maleic anhydride modified EPR (m-EPR) is more preferable.

In addition, the fiber-reinforced resin composition of the present embodiment may further include a reaction product of the polyamide resin and the compatibilizer. For example, such a reaction product of the polyamide resin and the compatibilizer can be incorporated into the fiber-reinforced resin composition when the polyamide resin and the compatibilizer are mixed together in the following method of producing a fiber-reinforced resin composition.

In addition, the fiber-reinforced resin composition of the present embodiment may further include other components as long as effects of the present embodiment are not impaired. Examples of the other components include a filler other than the reinforcing fiber; a thermoplastic resin other than the polyamide resin and the polyolefin resin; a flame retardant; a flame retardant promoter; a coloring agent; an antioxidant; an anti-UV agent; a heat stabilizer; an antimicrobial agent; and an antistatic agent. One of these may be used alone or two or more types thereof may be used in combination.

Specific examples of a filler other than the reinforcing fiber include glass beads, silica, graphite, a silicate compound (calcium silicate, aluminum silicate, kaolin, talc, clay, and the like), a metal oxide (iron oxide, titanium oxide, zinc oxide, antimony oxide, alumina, and the like), a carbonate, and a sulfate. One of these may be used alone or two or more types thereof may be used in combination.

Specific examples of other thermoplastic resins include a polyphenylene oxide resin, an ABS resin, a polyester resin (polybutylene terephthalate, polyethylene terephthalate, polybutylene succinate, polyethylene succinate, polylactic acid, and a polyhydroxyalkanoic acid), and a polycarbonate resin. One of these may be used alone or two or more types thereof may be used in combination.

Specific examples of the flame retardant include a halogen flame retardant (a halogenated aromatic compound), a phosphorus flame retardant (a nitrogen-containing phosphate compound, a phosphate ester, and the like), a nitrogen flame retardant (guanidine, triazine, melamine, and derivatives thereof, and the like), an inorganic flame retardant (a metal hydroxide, and the like), a boron flame retardant, a silicone flame retardant, a sulfur flame retardant, and a red phosphorus flame retardant. One of these may be used alone or two or more types thereof may be used in combination.

Specific examples of the flame retardant promoter include various antimony compounds, a zinc-containing metal compound, a bismuth-containing metal compound, magnesium hydroxide, and clay silicate. One of these may be used alone or two or more types thereof may be used in combination.

Specific examples of the coloring agent include a pigment and a dye. One of these may be used alone or two or more types thereof may be used in combination.

[Composition of Fiber-Reinforced Resin Composition]

In the fiber-reinforced resin composition of the present embodiment, a content of the polyamide resin (a total content in the case of a mixture, the same hereinafter) is 7 mass % to 93 mass % with respect to a total of 100 mass % of the polyamide resin and the polyolefin resin. A content of the polyamide resin is particularly preferably 10 mass % to 90 mass %, and most preferably 20 mass % to 80 mass %. When a content of the polyamide resin is less than the lower limit, the strength and the heat resistance of the fiber-reinforced resin composition tend to decrease. On the other hand, when a content of the polyamide resin exceeds the upper limit, there is a tendency of it becoming difficult to curb the occurrence of brittle fracture. Here, when the fiber-reinforced resin composition of the present embodiment further includes a reaction product of the polyamide resin and the compatibilizer, a content of the polyamide resin indicates an amount in terms of the polyamide resin blended in.

In addition, in the fiber-reinforced resin composition of the present embodiment, a content of the polyolefin resin (a total content in the case of a mixture, the same hereinafter) is 7 mass % to 93 mass % with respect to a total of 100 mass % of the polyamide resin and the polyolefin resin. A content of the polyolefin resin is particularly preferably 10 mass % to 90 mass %, and most preferably 20 mass % to 80 mass %. When a content of the polyolefin resin is less than the lower limit, there is a tendency of it becoming difficult to curb the occurrence of brittle fracture. On the other hand, when a content of the polyolefin resin exceeds the upper limit, the strength and the heat resistance of the fiber-reinforced resin composition tend to decrease.

In addition, in the fiber-reinforced resin composition of the present embodiment, a ratio between a content of the polyamide resin and a content of the polyolefin resin (a content of the polyamide resin: a content of the polyolefin resin) is 93:7 to 7:93, more preferably 90:10 to 10:90, and most preferably 80:20 to 20:80 in consideration of the same aspect as above In the fiber-reinforced resin composition of the present embodiment, a content of the reinforcing fiber (a total content in the case of a mixture, the same hereinafter) is 10 parts by mass to 200 parts by mass with respect to a total of 100 parts by mass of the polyamide resin and the polyolefin resin. A content of the reinforcing fiber is particularly preferably 15 parts by mass to 150 parts by mass and most preferably 20 parts by mass to 100 parts by mass. When a content of the reinforcing fiber is less than the lower limit, there is a tendency that a sufficient reinforcing effect of the reinforcing fiber is not exhibited. On the other hand, when a content of the reinforcing fiber exceeds the upper limit, there is a tendency that the viscosity of the fiber-reinforced resin composition increases and the moldability deteriorates.

When the fiber-reinforced resin composition of the present embodiment further includes the compatibilizer, a content thereof (a total content in the case of a mixture, the same hereinafter) is preferably 20 parts by mass or less, and more preferably 0.1 parts by mass to 10 parts by mass with respect to a total of 100 parts by mass of the polyamide resin and the polyolefin resin. When a content of the compatibilizer exceeds the upper limit, since compatibility between the polyamide resin and the polyolefin resin improves and they disperse each other, a proportion of the small dispersed phases increases and brittle fracture tends to occur easily. Here, when the fiber-reinforced resin composition of the present embodiment further includes a reaction product of the polyamide resin and the compatibilizer, a content of the compatibilizer indicates an amount in terms of the compatibilizer blended in.

In addition, when the fiber-reinforced resin composition of the present embodiment further includes other components, a content thereof (a total content in the case of two or more types thereof, the same hereinafter) is preferably 20 mass % or less and more preferably 0.01 mass % to 10 mass % with respect to a total mass of the fiber-reinforced resin composition. When a content of the other components exceeds the upper limit, mechanical properties and heat resistance of the fiber-reinforced resin composition tend to deteriorate.

[Structure of Fiber-Reinforced Resin Composition]

The fiber-reinforced resin composition of the present embodiment has a resin phase separation cross-sectional structure including the polyamide resin and the polyolefin resin, and specifically, when one resin between the polyamide resin and the polyolefin resin is set as a first resin, and the other resin is set as a second resin, it has a bicontinuous structure including a bicontinuous phase having a continuous phase A consisting of the first resin and a continuous phase B consisting of the second resin and at least one dispersed phase of a dispersed phase a consisting of the second resin dispersed in the continuous phase A and a dispersed phase b consisting of the first resin dispersed in the continuous phase B or a sea-island structure including a continuous phase C consisting of the first resin and a dispersed phase c consisting of the second resin dispersed in the continuous phase C. That is, the fiber-reinforced resin composition of the present embodiment forms at least one structure selected from the group consisting of a bicontinuous structure including a bicontinuous phase having a continuous phase consisting of the polyamide resin and a continuous phase consisting of the polyolefin resin, and at least one dispersed phase of a dispersed phase consisting of the polyolefin resin dispersed in the continuous phase consisting of the polyamide resin and a dispersed phase consisting of the polyamide resin dispersed in the continuous phase consisting of the polyolefin resin; a sea-island structure including a continuous phase (sea phase) consisting of the polyamide resin and a dispersed phase (island phase) consisting of the polyolefin resin dispersed in the continuous phase; and a sea-island structure including a continuous phase (sea phase) consisting of the polyolefin resin and a dispersed phase (island phase) consisting of the polyamide resin dispersed in the continuous phase. Which of these structures is formed depends on a content ratio between the polyamide resin and the polyolefin resin. The bicontinuous structure is formed when a ratio between a total content of the polyamide resin and a total content of the polyolefin resin (cross-sectional area ratio) is 1:1.5 to 1.5:1, and in the sea-island structure formed in other cases, a resin with a larger content forms a sea phase (continuous phase) and the other resin forms an island phase (dispersed phase).

Here, in the present embodiment, the resin phase separation cross-sectional structure can be checked using a microscope, more specifically, it can be checked when a cross section perpendicular to a long axis direction is cut out from parallel parts of the resin composition molded into a JIS K71621BA mold by injection molding and polished, and the cross section is observed using an optical microscope. Here, phases in the resin phase separation structure can be determined using image analysis software (for example, "WinROOF (commercially available from Mitani Corporation)").

The fiber-reinforced resin composition of the present embodiment may have any structure of a bicontinuous structure and a sea-island structure, but it includes at least one or more dispersed phases (dispersed phases a, b, and c) consisting of the other resin dispersed in the continuous phase (continuous phases A, B, and C) consisting of any one resin of the polyamide resin and the polyolefin resin. In particular, the fiber-reinforced resin composition of the present embodiment preferably has a sea-island structure including a continuous phase consisting of any one resin of the polyamide resin and the polyolefin resin and a dispersed phase consisting of the other resin dispersed in the continuous phase and/or preferably has at least a continuous phase consisting of the polyolefin resin and a dispersed phase consisting of the polyamide resin dispersed in the continuous phase.

In the fiber-reinforced resin composition of the present embodiment, in the resin phase separation cross-sectional structure, a total of cross-sectional areas of dispersed phases (hereinafter referred to as "small dispersed phases" in some cases) (a total cross-sectional area of small dispersed phases) having a cross-sectional area equal to or smaller than the average cross-sectional area of the reinforcing fiber is 20% or less with respect to a total of cross-sectional areas of all dispersed phases (a total cross-sectional area of all dispersed phases). A proportion of the total cross-sectional area of the small dispersed phases with respect to the total cross-sectional area of all dispersed phases is particularly preferably 0% to 18% and most preferably 0% to 15%. When a proportion of the total cross-sectional area of the small dispersed phases exceeds the upper limit, brittleness significantly deteriorates in the fiber-reinforced resin composition, and brittle fracture tends to occur easily.

Here, in the present embodiment, a cross-sectional area of the dispersed phase in the resin phase separation structure and an average cross-sectional area of the reinforcing fiber can be calculated in the resin phase separation cross-sectional structure observed using a microscope. More specifically, first, the cross section perpendicular to the long axis direction is cut out from the parallel part of the resin composition including the reinforcing fiber molded into the JIS K71621BA mold by injection molding and polished, and in a range of 200 µm×300 µm of the cross section observed using an optical microscope, cross-sectional areas of all dispersed phases and all reinforcing fibers determined using image analysis software (for example, "WinROOF (commercially available from Mitani Corporation)") are measured. Next, an average value of the measured cross-sectional areas of all reinforcing fibers is set as an average cross-sectional area of the reinforcing fibers, and a phase of which the cross-sectional area is equal to or smaller than the average cross-sectional area of the reinforcing fibers among the dispersed phases can be set as small dispersed phases.

In the fiber-reinforced resin composition of the present embodiment, the reinforcing fiber may be present in the continuous phase or in the dispersed phase, and it may be present in a phase consisting of the polyamide and in a phase consisting of the polyolefin. However, regarding the reinforcing fibers according to the present embodiment, in the resin phase separation cross-sectional structure observed under a microscope, a total of cross-sectional areas of the reinforcing fibers present in the phase consisting of the polyamide resin is preferably 75% or more, and more preferably 80% or more with respect to a total of cross-sectional areas of all reinforcing fibers. When a proportion of the reinforcing fibers present in a phase consisting of the polyamide resin is less than the lower limit, the maximum strength of the fiber-reinforced resin composition tends to decrease.

In the present embodiment, a proportion of the reinforcing fibers present in a phase consisting of the polyamide resin can be obtained when cross-sectional areas of all reinforcing fibers are measured in the same manner as in the cross-sectional area of the dispersed phases, and the average cross-sectional area of the reinforcing fibers is obtained as a proportion of the total cross-sectional area of the reinforcing fibers present in a phase consisting of the polyamide resin with respect to the total area. Here, in the fiber-reinforced resin composition of the present embodiment, a proportion of the reinforcing fibers present in a phase consisting of the polyamide resin does not necessarily match a proportion of the reinforcing fiber mixed together with the polyamide resin in advance during blending.

(Method of Producing Fiber-Reinforced Resin Composition)

Next, a method of producing a fiber-reinforced resin composition of the present embodiment will be described. The method of producing a fiber-reinforced resin composition of the present embodiment includes a process of mixing a polyamide resin and a reinforcing fiber to obtain a mixture (a first process) and a process of mixing the mixture with a polyolefin resin to obtain the fiber-reinforced resin composition of the present embodiment (a second process), and in the process of obtaining the mixture, an amount of the reinforcing fibers mixed with the polyamide resin is 75 mass % or more with respect to a total of 100 mass % of all reinforcing fibers blended into the fiber-reinforced resin composition. According to such a production method, it is possible to obtain a fiber-reinforced resin composition of the present embodiment having the above specific composition and structure with high efficiency. The polyamide resin, the reinforcing fiber, the polyolefin resin, and the obtained fiber-reinforced resin composition are as described in the fiber-reinforced resin composition of the present embodiment.

In the production method of the present embodiment, first, in the first process, the polyamide resin and the reinforcing fiber are mixed together. In the production method of the present embodiment, an amount of the reinforcing fibers mixed with the polyamide resin in advance is 75 mass % or more with respect to a total of 100 mass % of all reinforcing fibers blended into the fiber-reinforced resin composition. An amount of the reinforcing fiber blended in is particularly preferably 80 mass % to 100 mass % and most preferably 90 mass % to 100 mass %. When an amount of the reinforcing fiber blended in is less than the lower limit, a proportion of the small dispersed phases in the obtained fiber-reinforced resin composition increases and brittle fracture tends to occur easily.

Here, in the first process, when 10 parts by mass to 200 parts by mass (more preferably 15 parts by mass to 150 parts by mass, and most preferably 20 parts by mass to 100 parts by mass) with respect to a total amount blended into the fiber-reinforced resin composition, that is, a total of 100 parts by mass of the polyamide resin and the polyolefin resin blended into the fiber-reinforced resin composition, is not mixed with the polyamide resin in advance, the remaining reinforcing fibers may be mixed with the polyolefin resin in advance, and may be added separately and mixed in when the mixture is mixed with the polyolefin resin in the following second process.

In the first process, an amount of the polyamide resin mixed with the reinforcing fiber is preferably 75 mass % or more, more preferably 80 mass % to 100 mass %, and most preferably 90 mass % to 100 mass % with respect to a total of 100 mass % of the polyamide resin blended into the fiber-reinforced resin composition. When an amount of the polyamide resin blended in is less than the lower limit, a proportion of the small dispersed phases in the obtained fiber-reinforced resin composition increases and brittle fracture tends to occur easily.

Here, in the first process, when 7 mass % to 93 mass % (more preferably 10 mass % to 90 mass %, and most preferably 20 mass % to 80 mass %) with respect to a total amount blended into the fiber-reinforced resin composition, that is, a total of 100 mass % of the polyamide resin and the polyolefin resin blended into the fiber-reinforced resin composition, is not mixed with the reinforcing fiber in advance, the remaining polyamide resin may be added separately and mixed in when the mixture is mixed with the polyolefin resin in the following second process.

In the first process, the mixing method is not particularly limited, and a melt kneading method using a kneading device may be used. Examples of the kneading device include an extruder (a single screw extruder, a twin screw melt kneading extruder, and the like), a kneader, a mixer (a high speed flow type mixer, a paddle mixer, a ribbon mixer, and the like), and an injection molding machine. One of these may be used alone or two or more types thereof may be used in combination. In addition, when two or more types thereof are used in combination, they may be operated continuously or batchwise (in a batch type). In addition, components to be mixed in may be kneaded in at once, or any component may be added a plurality of times in a divided manner (multi-stage blending) and kneaded in.

A mixing temperature in the first process is not particularly limited, and is appropriately adjusted depending on the type of the polyamide resin and cannot be stated definitely. However, in consideration of mixing in a molten state, for example, 200° C. to 320° C. is preferable, and 230° C. to 300° C. is more preferable. In addition, a mixing time is not particularly limited, and is, for example, 1 minute to 1 hour.

The mixture obtained in this manner may be a solid substance solidified during pelletization or the like or may be a molten substance. In addition, a commercially available example such as a carbon fiber reinforced polyamide (product name: Plastron commercially available from Daicel Polymer Ltd.), and a carbon fiber reinforced polyamide (product name: Torayca short fiber pellet, and Torayca long fiber pellet commercially available from Toray Industries, Inc.) may be appropriately used.

In the production method of the present embodiment, next, in the second process, the mixture and the polyolefin resin are mixed together. 7 mass % to 93 mass % (more preferably 10 mass % to 90 mass %, and most preferably 20 mass % to 80 mass %) of the polyolefin resin with respect to a total amount blended into the fiber-reinforced resin composition, that is, a total of 100 mass % of the polyamide resin and the polyolefin resin blended into the fiber-reinforced resin composition, may be directly mixed with the mixture, and at least a part thereof may be mixed in as a mixture mixed with the remaining reinforcing fiber in advance.

Here, in the second process, when the polyolefin resin is mixed in as a mixture mixed with the remaining reinforcing fiber in advance, an amount of the polyolefin resin mixed with the reinforcing fiber is not particularly limited, but it is preferably 75 mass % or less, more preferably 60 mass % or less, and most preferably 50 mass % or less with respect to a total of 100 mass % of the polyolefin resin blended into the fiber-reinforced resin composition. When an amount of the polyolefin resin blended in exceeds the upper limit, there is a tendency of it becoming difficult to curb the occurrence of brittle fracture.

In the second process, the mixing method is not particularly limited, and for example, a method in which the mixture, the polyolefin resin, and as necessary, the polyamide resin alone, the reinforcing fiber alone, a mixture of the polyolefin resin and the reinforcing fiber, the compatibilizer and the other components are mixed by dry blending in advance or the like, and then melt-kneaded using a kneading device may be used. The kneading device and the kneading method are the same as those described in the first process.

A mixing temperature in the second process is not particularly limited, and is appropriately adjusted depending on the type of the polyamide resin and the polyolefin resin or the like and cannot be stated definitely. However, for example, 200° C. to 330° C. is preferable, and 230° C. to 300° C. is more preferable. In addition, a mixing time is not particularly limited, and is, for example, 1 minute to 1 hour.

In the production method of the present embodiment, the mixture obtained as the solid substance and/or the molten substance in the first process and the polyolefin resin may be melt-kneaded, and the mixture may be prepared on the upstream side and the polyolefin resin may be then added thereto on the downstream side and melt-kneaded using a multi-stage blending type kneading device or the like to obtain the fiber-reinforced resin composition of the present embodiment. In addition, the obtained fiber-reinforced resin composition may be a solidified during pelletization or the like, or may be a molded solid substance, or a molten substance.

(Molded Article)

The fiber-reinforced resin composition of the present embodiment may be molded by any method. The molding method is not particularly limited, and a method known in the related art can be appropriately used as a method of molding a resin composition. For example, a molding method used for general thermoplastic resins such as injection molding, extrusion molding, blow molding, or compression molding (press molding) can be used.

In addition, the shape, size, thickness and the like of the fiber-reinforced resin composition of the present embodiment are not particularly limited, and applications thereof are not particularly limited. For example, the fiber-reinforced resin composition of the present embodiment can be used as an exterior material, an interior material, a structural material and the like of an automobile, a railway vehicle, a ship, an airplane, and the like. Examples of the exterior material, interior material, and structural material of the automobile include an automobile exterior material, an automobile interior material, an automobile structural material, an automobile impact energy absorbing material, an automobile pedestrian protection material, an automobile passenger protection material, and components in the engine compartment. In addition, the fiber-reinforced resin composition of the present embodiment can be used as an interior material, an exterior material and a structural material of a building, furniture, and the like, specifically, for example, a door covering material, a door structural material, and a covering material, a structural material, and the like of various types of furniture (a desk, a chair, a shelf, a cabinet, and the like), and additionally, can be used as a packaging member, a housing component (a tray, and the like), a protective member, a partition member, and a housing and a structure of home appliances (a slim-type TV, a refrigerator, a washing machine, a vacuum cleaner, a mobile phone, a mobile game machine, a laptop computer, and the like).

While the present disclosure will be described below in further detail with reference to examples and comparative examples, the present disclosure is not limited to the following examples. Here, morphological observation and performance evaluation of resin compositions obtained in the examples and the comparative examples were performed according to the following methods.

(Morphological Observation)

According to morphological observation, a resin phase separation cross-sectional structure was checked and a proportion of the small dispersed phases was calculated. First, cross sections perpendicular to a long axis direction were cut out from parallel parts of test pieces for measuring physical properties obtained in the examples and the comparative examples and embedded in an epoxy resin, and mechanically polished. Next, the cross sections were observed using an optical microscope ("ECLIPSELV100N," commercially available from Nikon Corporation) with a magnification of 50. In a range of 200 μm×300 μm observed using the optical microscope, a polyamide resin, a polyolefin resin, and reinforcing fibers were identified, and cross-sectional areas of all dispersed phases and all reinforcing fibers within the above range were then measured using image analysis software ("WinROOF," commercially available from Mitani Corporation). The measured cross-sectional areas of all reinforcing fibers were averaged to obtain an average cross-sectional area of the reinforcing fibers, and a phase of which the cross-sectional area was equal to or smaller than the average cross-sectional area of the reinforcing fibers among dispersed phases within the range was set as small dispersed phases, and a proportion of the small dispersed phases [%] ((a total cross-sectional area of small dispersed phases/a total cross-sectional area of all dispersed phases)×100) was obtained. In addition, within the above range, a proportion of a total of cross-sectional areas of the reinforcing fibers present in a phase consisting of the polyamide resin with respect to a total of cross-sectional areas of all reinforcing fibers [%] ((a total cross-sectional area of the reinforcing fibers present in a phase consisting of the polyamide resin/a total cross-sectional area of all reinforcing fibers)×100) was obtained.

(Performance Evaluation)

[Measurement of Bending Elastic Modulus and Bending Strength]

The test pieces for measuring physical properties obtained in the examples and the comparative examples were vacuum-dried at 80° C. for 12 hours, and were then subjected to a bending test under conditions of a distance between supporting points: 32 mm, a displacement speed: 1 mm/min, and a temperature: 23° C. using a universal testing machine (commercially available from Instron Japan Co., Ltd.). A slope between 0.05% to 0.25% in strain in the obtained stress [GPa]-strain curve was set as a bending elastic modulus [GPa] and the maximum stress was set as a bending strength [GPa].

[Evaluation of Fracture Form]

In the bending test, the state of the test piece after the maximum stress was exhibited was observed with the naked eye, and the fracture form was evaluated according to the following criteria:

Evaluation A: The test piece did not split after the maximum stress was exhibited (even if cracks occurred in a bent part, their propagation was curbed and the test piece did not split)

Evaluation B: After the maximum stress was exhibited, the test piece cracked and divided into two parts in a fracture surface, and rapid cracking occurred.

In addition, the crack surface (fracture surface) appearing after the maximum stress was exhibited in the bending test was observed under conditions of an acceleration voltage: 15 kV, and a magnification: 500 using a scanning electron microscope (SEM, "S-3600," commercially available from Hitachi High-Tech Manufacturing & Service Corporation).

Example 1

First, 50 parts by mass of a carbon fiber reinforced polyamide pellet (PA-CF, "Plastron PA6-CF40," commercially available from Daicel Polymer Ltd.) in which polyamide 6 (PA) and a carbon fiber (CF) were mixed in advance in a mass ratio of 3:2 and 50 parts by mass of polypropylene (PP, "E111G," commercially available from Prime Polymer Co., Ltd., MFR: 0.5 g/10 min) were dry-blended, and the mixture was then melt-kneaded under a condition of a cylinder temperature: 270° C. to obtain a resin composition and subjected to injection molding under a condition of a mold temperature: 135° C. using a desktop injection molding machine (commercially available from Shinko Sellbic Co., Ltd.), and the resin composition was molded into the JIS K71621BA mold to prepare a test piece for measuring physical properties.

Example 2

A test piece for measuring physical properties was prepared in the same manner as in Example 1 except that 45 parts by mass of a carbon fiber reinforced polyamide pellet (PA-CF), 47 parts by mass of polypropylene (PP), 3 parts by mass of polyamide 6 (PA, "A1030BRL," commercially available from Unitika Ltd.), and 5 parts by mass of a carbon fiber reinforced polypropylene pellet (PP-CF, "Plastron PP-CF40," commercially available from Daicel Polymer Ltd.) in which polypropylene (PP, MFR: 0.5 g/10 min) and a carbon fiber were mixed in advance in a mass ratio of 3:2 were dry-blended and then used.

Example 3

A test piece for measuring physical properties was prepared in the same manner as in Example 1 except that 40 parts by mass of a carbon fiber reinforced polyamide pellet (PA-CF), 44 parts by mass of polypropylene (PP), 6 parts by mass of polyamide 6 (PA), and 10 parts by mass of a carbon fiber reinforced polypropylene pellet (PP-CF) were dry-blended and then used.

Example 4

A test piece for measuring physical properties was prepared in the same manner as in Example 1 except that 75 parts by mass of a carbon fiber reinforced polyamide pellet (PA-CF) and 25 parts by mass of polypropylene (PP) were dry-blended and then used.

Example 5

A test piece for measuring physical properties was prepared in the same manner as in Example 1 except that 45 parts by mass of a carbon fiber reinforced polyamide pellet (PA-CF), 45 parts by mass of polypropylene (PP), and 10 parts by mass of a maleic anhydride modified SEBS (m-SEBS, "FG1901G," commercially available from Kraton Polymer Japan) were dry-blended and then used.

Comparative Example 1

A test piece for measuring physical properties was prepared in the same manner as in Example 1 except that 35 parts by mass of a carbon fiber reinforced polyamide pellet (PA-CF), 41 parts by mass of polypropylene (PP), 9 parts by mass of polyamide 6 (PA), and 15 parts by mass of a carbon fiber reinforced polypropylene pellet (PP-CF) were dry-blended and then used.

Comparative Example 2

A test piece for measuring physical properties was prepared in the same manner as in Example 1 except that 25 parts by mass of a carbon fiber reinforced polyamide pellet (PA-CF), 35 parts by mass of polypropylene (PP), 15 parts by mass of polyamide 6 (PA), and 25 parts by mass of a carbon fiber reinforced polypropylene pellet (PP-CF) were dry-blended and then used.

The contents of the polyamide resin (PA and/or PA-CF), the polyolefin resin (PP and/or PP-CF), and the compatibilizer (m-SEBS) blended together in Examples 1 to 5 and Comparative Examples 1 and 2 are shown in the following Table 1. The unit in Table 1 is "parts by mass." In Table 1, regarding the carbon fiber (CF), a blending amount mixed with the polyamide resin in advance and a blending amount mixed with the polyolefin resin in advance are shown in parentheses, and the blending ratio (CF blending ratio [within PA:within PP]) is shown together therewith.

TABLE 1

| | Polyamide resin | | Polyolefin resin | | | |
|---|---|---|---|---|---|---|
| | PA | PA-CF (within CF) | PP | PP-CF (within CF) | Compatibilizer m-SEBS | CF blending ratio (within PA:within PP) |
| Example 1 | — | 50 (20) | 50 | — | — | 100:— |
| Example 2 | 3 | 45 (18) | 47 | 5 (2) | — | 90:10 |
| Example 3 | 6 | 40 (16) | 44 | 10 (4) | — | 80:20 |
| Example 4 | — | 75 (30) | 25 | — | — | 100:— |
| Example 5 | — | 45 (18) | 45 | — | 10 | 100:— |
| Comparative Example 1 | 9 | 35 (14) | 41 | 15 (6) | — | 70:30 |
| Comparative Example 2 | 15 | 25 (10) | 35 | 25 (10) | — | 50:50 |

Figure 6:
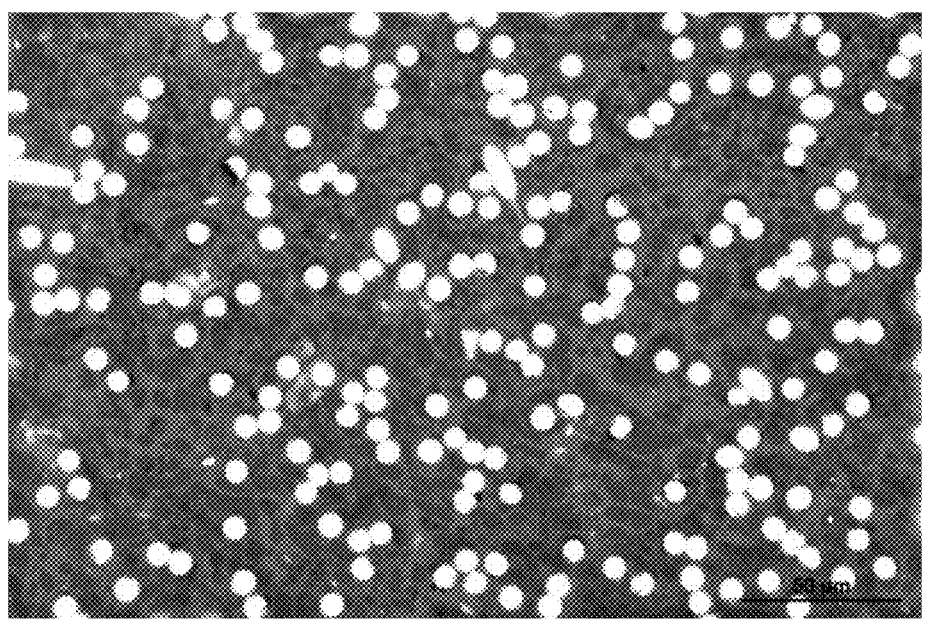
FIG. 6 is an optical microscope image of a cross section of a test piece for measuring physical properties obtained in Comparative Example 1.
Figure 7:
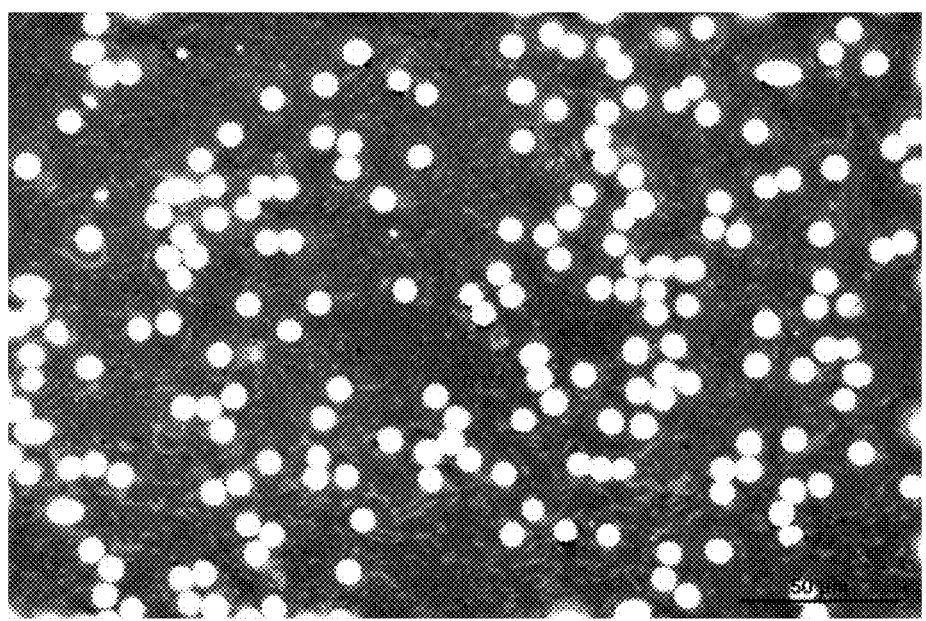
FIG. 7 is an optical microscope image of a cross section of a test piece for measuring physical properties obtained in Comparative Example 2.
Figure 8:
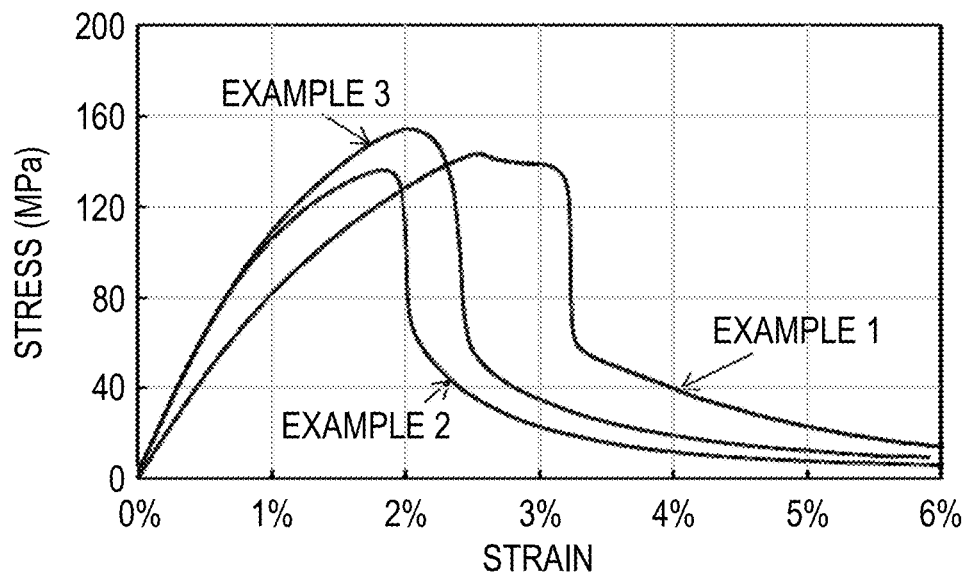
FIG. 8 shows a stress-strain curve obtained when a bending test is performed on the test pieces for measuring physical properties obtained in Examples 1 to 3.
Figure 9:
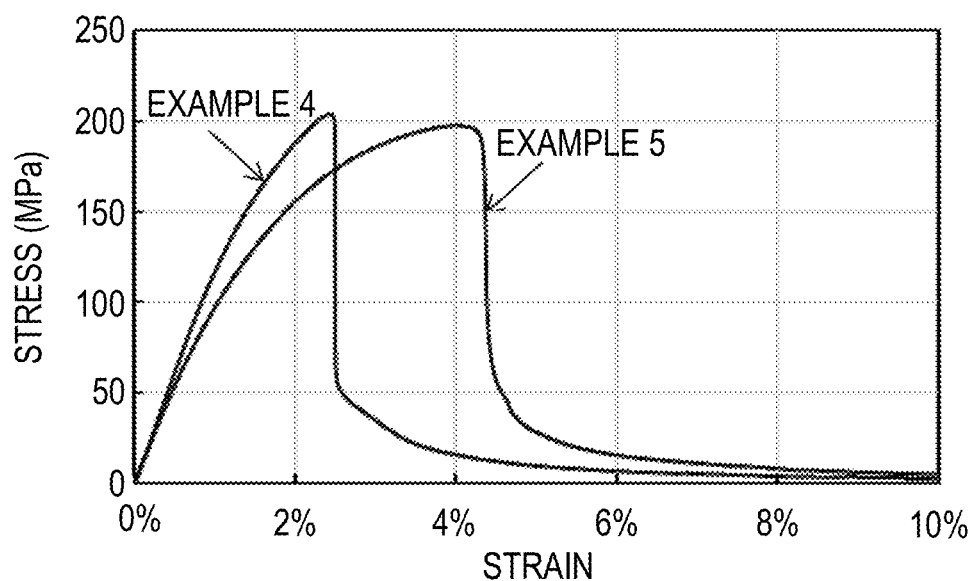
FIG. 9 shows a stress-strain curve obtained when a bending test is performed on the test pieces for measuring physical properties obtained in Examples 4 and 5.
Figure 10:
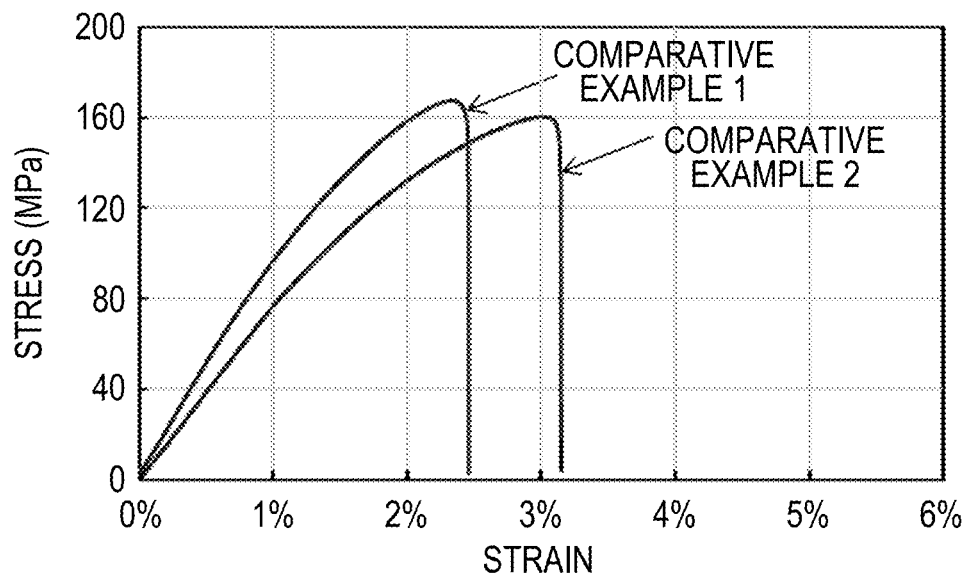
FIG. 10 shows a stress-strain curve obtained when a bending test is performed on the test pieces for measuring physical properties obtained in Comparative Examples 1 and 2.
Figure 11:
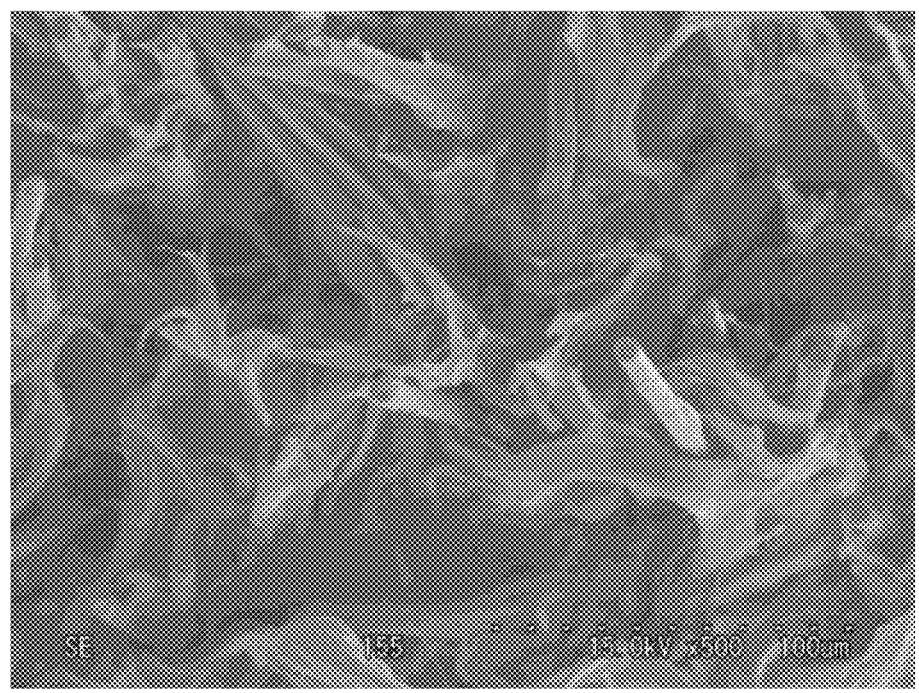
FIG. 11 is a scanning electron microscope (SEM) image of a crack surface of the test piece for measuring physical properties obtained in Example 1.
Figure 12:
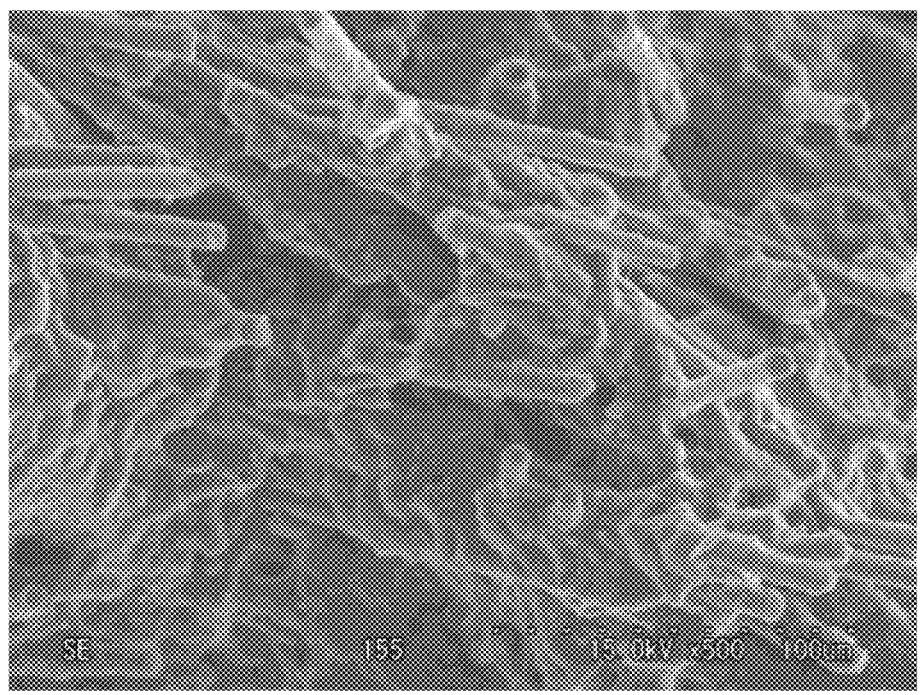
FIG. 12 is a scanning electron microscope (SEM) image of a crack surface of the test piece for measuring physical properties obtained in Comparative Example 2.

The morphology of the test piece for measuring physical properties obtained in Examples 1 and 5 and Comparative Examples 1 and 2 was observed and the obtained optical microscope images of the cross sections are shown in FIG. 1A, and FIG. 2 to FIG. 7. In addition, FIG. 1B shows a result obtained by performing image analysis on the test piece for measuring physical properties obtained in Example 1 in morphological observation. Here, FIG. 1B shows a separate color drawing as reference data. In addition, performance evaluation was performed on the test pieces for measuring physical properties obtained in Examples 1 to 5 and Comparative Examples 1 and 2. The obtained stress-strain curves are shown in FIG. 8 to FIG. 10, and scanning electron microscope (SEM) images of crack surfaces (fracture surface) on the test pieces for measuring physical properties obtained in Example 1 and Comparative Example 2 are shown in FIG. 11 to FIG. 12. In addition, a proportion [%] of the small dispersed phases obtained when morphological observation was performed, the bending elastic modulus (elastic modulus [GPa]) and the bending strength (strength [GPa]) obtained when performance evaluation was performed, and fracture form evaluation results are shown in the following Table 2 together with the compositions of the resin compositions in the examples and the comparative examples. In addition, in Table 2, contents (% within PA+PP) of polyamide 6 and polypropylene in a total of parts by mass (PA+PP) of polyamide 6 and polypropylene, and parts by mass (with respect to PA+PP) of the carbon fiber and the maleic anhydride modified SEBS with respect to the total of 100 parts by mass are shown in parentheses together therewith.

TABLE 2

| | Composition [wt %] | | | | Proportion of small dispersed phases [%] | Evaluation | | |
| --- | --- | --- | --- | --- | --- | --- | --- | --- |
| | PA (% within PA + PP) | PP (% within PA + PP) | CF (with respect to PA + PP) | m-SEBS (with respect to PA + PP) | | Elastic modulus [GPa] | Strength [GPa] | Fracture form |
| Example 1 | 30 (37.5) | 50 (62.5) | 20 (25) | — | 5 | 7.6 | 150 | A |
| Example 2 | 30 (37.5) | 50 (62.5) | 20 (25) | — | 13 | 9.8 | 136 | A |
| Example 3 | 30 (37.5) | 50 (62.5) | 20 (25) | — | 13 | 10.0 | 155 | A |
| Example 4 | 45 (64.3) | 25 (35.7) | 30 (42.9) | — | 6 | 12.8 | 203 | A |
| Example 5 | 27 (37.5) | 45 (62.5) | 18 (25) | 10 (13.9) | 17 | 10.7 | 200 | A |
| Comparative Example 1 | 30 (37.5) | 50 (62.5) | 20 (25) | — | 25 | 10.6 | 167 | B |
| Comparative Example 2 | 30 (37.5) | 50 (62.5) | 20 (25) | — | 65 | 10.9 | 160 | B |

Figure 1B:
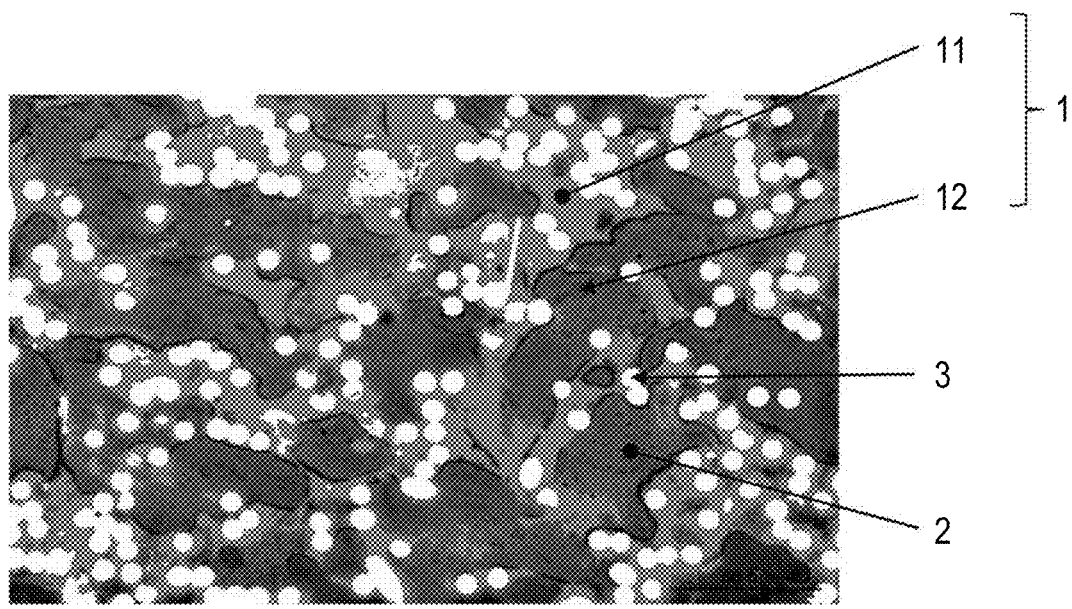
FIG. 1B is a diagram showing a result of morphological image analysis on the cross section of the test piece for measuring physical properties obtained in Example 1.
Figure 2:
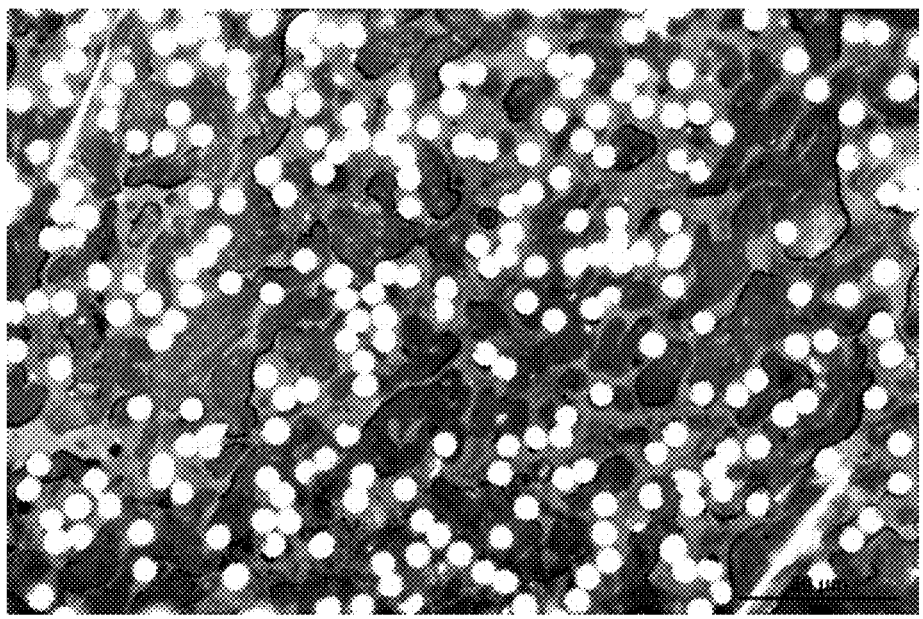
FIG. 2 is an optical microscope image of a cross section of a test piece for measuring physical properties obtained in Example 2.
Figure 3:
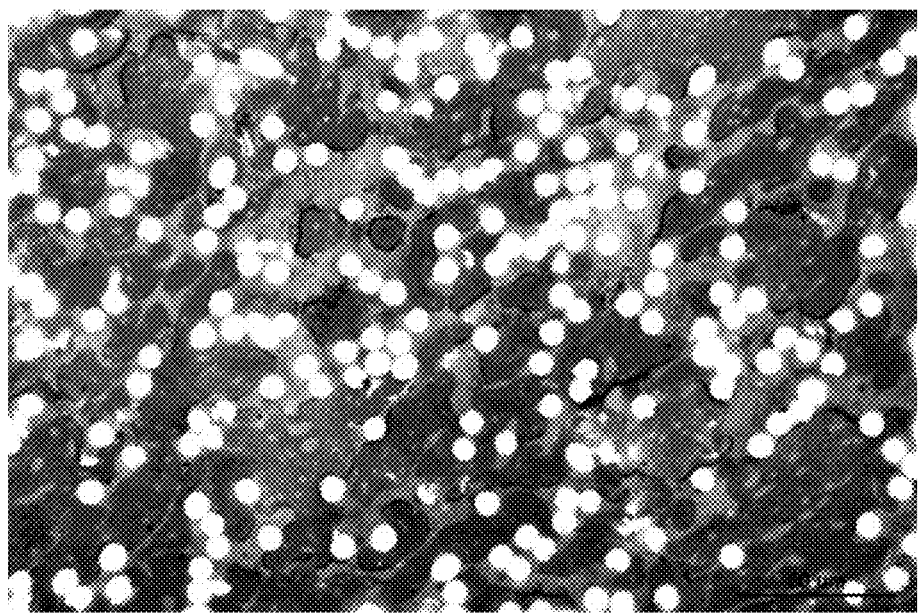
FIG. 3 is an optical microscope image of a cross section of a test piece for measuring physical properties obtained in Example 3.
Figure 4:
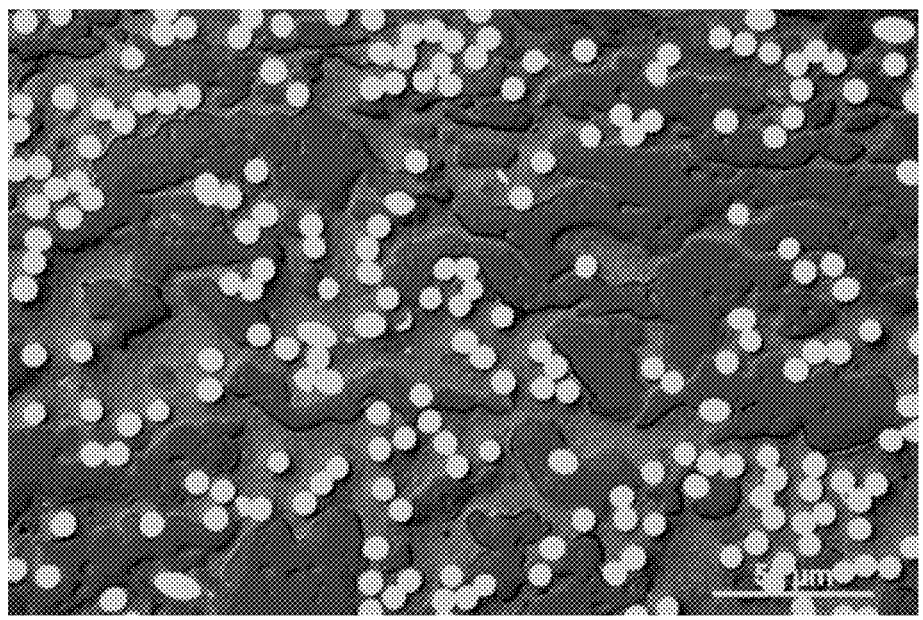
FIG. 4 is an optical microscope image of a cross section of a test piece for measuring physical properties obtained in Example 4.
Figure 5:
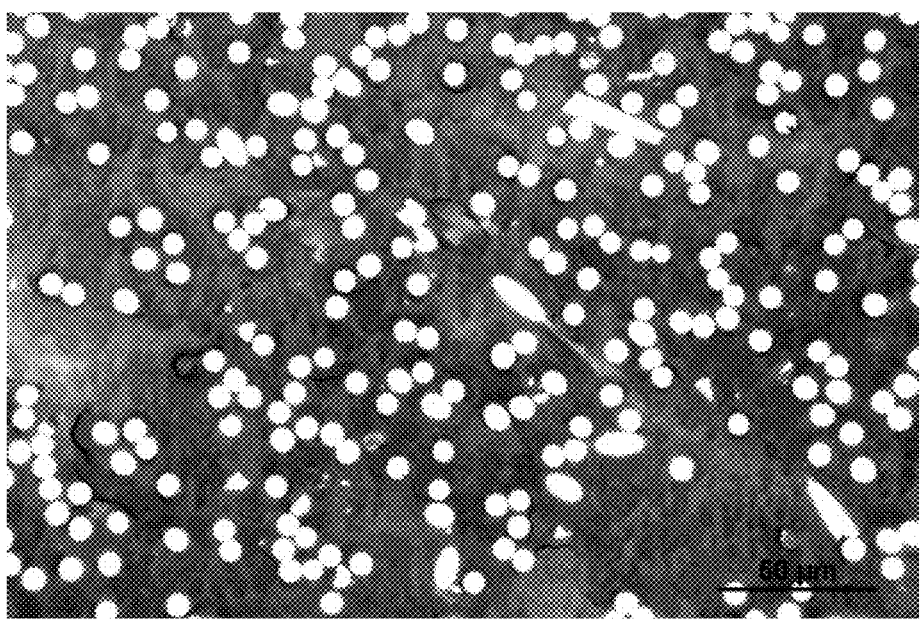
FIG. 5 is an optical microscope image of a cross section of a test piece for measuring physical properties obtained in Example 5.

As shown in FIG. 1A and FIG. 1B, in Example 1, a dispersed phase 1 consisting of polyamide 6 dispersed in a continuous phase 2 consisting of polypropylene was provided, and as the dispersed phase 1, there were a small dispersed phase 12 having a cross-sectional area equal to or smaller than the average cross-sectional area of a carbon fiber 3 and a large dispersed phase 11 having a cross-sectional area larger than the average cross-sectional area of the carbon fiber 3. However, as shown in Table 2, a proportion of the small dispersed phases was 5%, which was sufficiently small. In addition, as shown in FIG. 2 to FIG. 5, also in Examples 2 to 5, both the phase consisting of polypropylene and the phase consisting of polyamide 6 were formed as a phase having a large cross-sectional area, and a proportion of the small dispersed phases was low as shown in Table 2. Here, in all of Examples 1 to 5, a total cross-sectional area of the carbon fibers present in the phase consisting of polyamide 6 was 75% or more with respect to the total cross-sectional area of all carbon fibers. On the other hand, as shown in FIG. 6 to FIG. 7, in Comparative Examples 1 and 2, both the phase consisting of polypropylene and the phase consisting of polyamide 6 formed a structure having a fine dispersed phase, and a proportion of the small dispersed phases was large as shown in Table 2.

In addition, in all of Examples 1 to 5 in which a proportion of the small dispersed phases was low, as shown in Table 2, the bending elastic modulus and the bending strength were sufficiently high, and as shown in FIG. 8 to FIG. 9, it was confirmed that, even if propagation of cracking was curbed during progress and large strain was received, cracking did not occur and the occurrence of brittle fracture was curbed. On the other hand, when a proportion of the small dispersed phases exceeded 20% (Comparative Examples 1 and 2), as shown in Table 2, although the bending elastic modulus and the bending strength were large, as shown in FIG. 10, it was confirmed that cracks rapidly propagated after the maximum stress was exceeded, cracking occurred, and brittleness significantly deteriorated.

In addition, in FIG. 11 to FIG. 12, in Example 1, it was confirmed that some phases consisting of polypropylene stretched in a fibril from the periphery of the carbon fiber on a crack surface appeared in the bending test. However, in Comparative Example 2, no fibrils forming on the crack surface (fracture surface) were confirmed, and in the fiber-reinforced resin composition according to the embodiment of the present disclosure, it was shown that a phase consisting of polyolefin was stretched and strain hardening was caused during deformation and propagation of cracks was prevented.

As described above, according to the present disclosure, it is possible to provide a fiber-reinforced resin composition in which the occurrence of brittle fracture is sufficiently curbed and a method of producing the same.

What is claimed is:

1. A method of producing a fiber-reinforced resin composition, comprising:
   a first process of mixing a polyamide resin and a reinforcing carbon fiber to obtain a mixture; and
   a second process of mixing the mixture with a polyolefin resin as the only resin to obtain the fiber-reinforced resin composition, the fiber-reinforced resin composition comprising
   a polyamide resin;
   a polyolefin resin; and
   a reinforcing carbon fiber,
   wherein the content of the polyamide resin and the content of the polyolefin resin are 7 mass % to 93 mass %, and 7 mass % to 93 mass %, respectively, with respect to the total of 100 mass % of the polyamide resin and the polyolefin resin,
   the content of the reinforcing carbon fiber is 10 parts by mass to 200 parts by mass with respect to a total of 100 parts by mass of the polyamide resin and the polyolefin resin,
   when one resin between the polyamide resin and the polyolefin resin is set as a first resin, and the other resin is set as a second resin,
   the composition has
   a bicontinuous structure including (i) a bicontinuous phase having a continuous phase A consisting of the first resin and a continuous phase B consisting of the second resin and (ii) at least one of a first dispersed phase (a) consisting of the second resin dispersed in the continuous phase A and a second dispersed phase (b) consisting of the first resin dispersed in the continuous phase B, or a sea-island structure including a continuous phase C consisting of the first resin and a dispersed phase (c) consisting of the second resin dispersed in the continuous phase C, and in a resin phase separation cross-sectional structure observed under a microscope, the total of cross-sectional areas of the first dispersed phases or the second dispersed phases having a cross-sectional area equal to or smaller than an average cross-sectional area of the reinforcing carbon fiber is 20% or less with respect to the total of cross-sectional areas of all dispersed phases observed under the microscope, and the total of cross-sectional areas of the reinforcing carbon fibers present in a phase consisting of the polyamide resin is 75% or more with respect to a total of cross-sectional areas of all reinforcing carbon fibers observed under the microscope, where, in the first process, the amount of the reinforcing carbon fibers mixed with the polyamide resin is 75 mass % or more with respect to a total of 100 mass % of all reinforcing carbon fibers blended into the fiber-reinforced resin composition, and where the remaining reinforcing carbon fiber is added to the mixture after the first process.

2. The fiber-reinforced resin composition according to claim 1, wherein
the polyolefin resin contains a polymer in which a content of structural units derived from propylene is 50 mol % or more of all structural units of the polyolefin resin.

3. The fiber-reinforced resin composition according to claim 1, wherein
the melt flow rate of the polyolefin resin is 0.1 g/10 min to 20 g/10 min.

4. The fiber-reinforced resin composition according to claim 1, wherein
the polyamide resin contains at least one selected from the group consisting of polyamide 6, polyamide 66, polyamide 610, and polyamide 11.

* * * * *